United States Patent Office — 3,772,372 — Patented Nov. 13, 1973

3,772,372
N-ARYL UREAS
Erich Klauke, Odenthal-Hahnenberg, Engelbert Kuhle, Bergisch Gladbach, Ludwig Eue, Cologne-Stammheim, and Helmuth Hack, Cologne-Buchheim, Germany, assignors to Bayer Aktiengesellschaft, Leverkusen, Germany
No Drawing. Filed June 3, 1969, Ser. No. 830,121
Claims priority, application Germany, June 10, 1968,
P 17 68 634.9
Int. Cl. C07c 127/00
U.S. Cl. 260—553 A          10 Claims

ABSTRACT OF THE DISCLOSURE

N-aryl ureas, i.e. N-[(3- or 4-difluoromethyl and optionally 4- or 3-chloro)-phenyl]-N'-(optionally alkyl)-N'-(alkyl or alkenyl)-ureas which possess herbicidal properties, and which may be produced by conventional methods.

---

The present invention relates to and has for its objects the provision for particular new N-aryl ureas, i.e. N-[(3- or 4-difluoromethyl and optionally 4- or 3-chloro)-phenyl]-N'-(optionally alkyl)-N'-(alkyl or alkenyl)-ureas, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is already known that N-aryl-N'-alkyl ureas can be used as herbicides. It is also known that N-(3-trifluoromethyl-phenyl)-N',N'-dimethyl urea (A) can be used as selective herbicide (see U.S. Pat. 3,134,665). The latter has attained a considerable importance in the control of weeds in cotton.

It has been found, in accordance with the present invention, that the particular new N-aryl ureas of the formula:

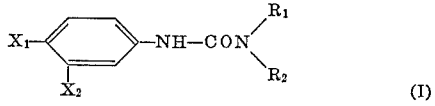

in which one of $X_1$ and $X_2$ is difluoromethyl, while the other of $X_1$ and $X_2$ is chloro or hydrogen,
$R_1$ is hydrogen, or alkyl of 1–4 carbon atoms, and
$R_2$ is alkyl of 1–4 carbon atoms, or alkenyl of 3–4 carbon atoms, exhibit strong herbicidal, in particular selective herbicidal, properties.

It has been furthermore found, in accordance with the present invention, that the particular new N-aryl ureas of Formula I above may be produced by the process which comprises reacting an isocyanate of the formula

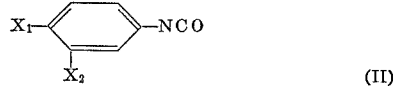

in which $X_1$ and $X_2$ are the same as defined above, in the presence of a solvent, with an amine of the formula:

in which $R_1$ and $R_2$ are the same as defined above.

It is decidedly surprising that the instant new N-difluoromethyl phenyl ureas of Formula I above exhibit, with simultaneous good herbicidal activity, a higher selectivity towards agricultural cultivated plants than the known N-(3-trifluoromethyl-phenyl)-N',N'-dimethyl urea (A).

When 3-difluoromethyl-phenyl isocyanate and dimethylamine are used, the reaction course in accordance with the present invention can be represented by the following formula scheme:

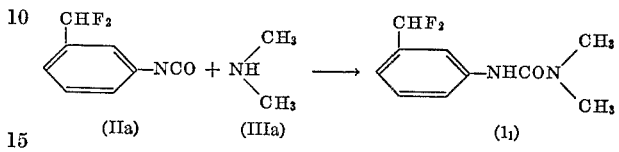

Advantageously, in accordance with the present invention, in the various formulae herein:

$R_1$ represents hydrogen, or lower alkyl of 1–4 carbon atoms such as methyl, ethyl, n- and iso-propyl, n-, iso-, sec.- and tert.-butyl, and the like, especially $C_{1-3}$ or $C_{1-2}$ alkyl, and more especially methyl;

$R_2$ represents lower alkyl of 1–4 carbon atoms such as methyl to tert.-butyl inclusive, and the like, as defined above, especially $C_{1-3}$ or $C_{1-2}$ alkyl, and more especially methyl, or lower alkenyl of 3–4 carbon atoms such as α-, β- and γ-allyl, but-1,2 and 3-enyl, and the like, especially $C_3$ alkenyl, and more especially α-allyl;

One of $X_1$ and $X_2$ represents difluoromethyl, while the other of $X_1$ and $X_2$ represents chloro, or hydrogen;

$R_1$ and $R_2$ being the same or different when both are $C_{1-4}$ alkyl.

Preferably, $R_1$ is hydrogen or $C_{1-4}$ or $C_{1-2}$ alkyl; $R_2$ is $C_{1-4}$ or $C_{1-2}$ alkyl, or $C_3$ alkenyl; $R_1$ and $R_2$ preferably being the same when $R_1$ and $R_2$ are both $C_{1-4}$ alkyl; and one of $X_1$ and $X_2$ is difluoromethyl while the other is hydrogen or chloro.

In particular, $R_1$ is hydrogen, or $C_{1-2}$ alkyl; $R_2$ is $C_{1-2}$ alkyl; $X_2$ is difluoromethyl; and $X_1$ is hydrogen.

The isocyanates of the Formula II above are not yet known. Such isocyanates can be prepared in simple manner via the appropriate nitro-difluoromethyl-benzenes some of which are known.

Expediently, when preparing the isocyanates the following procedure is followed:

(1) (Possibly substituted) benzal chlorides are reacted with anhydrous hydrofluoric acid in a pressure vessel at a temperature of from 0 to 150° C., optionally in the presence of a solvent, such as carbon tetrachloride, benzene or chlorobenzene. The appropriate nitrobenzal fluorides are formed.

(2) The nitrobenzal fluorides obtained are subjected in the usual manner to a catalytic reduction on Raney nickel, the appropriate aminobenzal fluorides being formed.

(3) From the aminobenzal fluorides, the appropriate isocyanates are prepared by phosgenating the amines in the customary manner, most expediently in chlorobenzene in a concentration of 10 to 15 percent by weight of amine.

Further isocyanates usable in accordance with the present invention include: 4-difluoromethyl-phenyl isocyanate, 3-chloro-4-difluoromethyl-phenyl isocyanate, 3-difluoromethyl-4-chloro-phenyl isocyanate, and the like.

The amines of the Formula III above are well known. Suitable amines are for example methyl amine, dimethyl amine, methylethyl amine, allyl amine, methylbutyl amine, diallyl amine, and the like.

Suitable solvents for the production reaction are water and all inert organic solvents. In this regard, the term solvent as used herein includes were diluents.

Preferred solvents include ethers, such as dioxan; hydrocarbons, such as benzene; and chlorinated hydrocarbons, such as chlorobenzene; and the like.

The reaction temperatures can be varied advantageously within a fairly wide range. In general, the reaction is carried out at substantially between about 10–80° C., preferably from between about 20–50° C.

When carrying out the instant production process, equivalent amounts of isocyanate and amine are usually used, but an excess of amine is not harmful. Working up of the reaction product takes place in the customary manner, as the artisan will appreciated.

Advantageously, the instant ureas exhibit a strong herbicidal potency and can therefore be used as weed killers. By weeds are meant in the broadest sense all plants which grow in places where they are not desired. Whether the active compounds according to the present invention act as total or selective herbicidal agents depends on the amount applied, as the artisan will appreciate.

The active compounds according to the present invention can be used for example in the case of the following plants: dicotyledons, such as mustard (Sinapis), cress (Lepidium), cleaver (Galium), common chickeed (Stellaria), mayweed (Matricaria), smallflower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echionchloa), maize (Zea), rice (Oryza), oat (Avena), barley (Hordeum), wheat (Triticum), millet (Panicum), sugar cane (Saccharum); and the like.

Besides the herbicidal properties, the instant active compounds also exhibit some acaricidal properties, particularly against acarids which infest useful plants.

The active compounds according to the instant invention can be utilized, if desired, in the form of the usual formulations or compositions with conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g., ethanolamine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.), and ground synthetic minerals (e.g., highly dispersed silicic acid, silicates, e.g. alkali silicates, etc.); whereas the following may be chiefly considered for use as conventional carrier vehicle assistants, e.g. surface-active agents, for this purpose: emulsifying agent, such as nonionic and/or anionic emulsifying agents (e.g., polyethylene oxide esters of fatty acids, polyethylene oxide ethers of atty alcohols, alkyl sulfonates, aryl sulfonates, etc., and especially alkyl arylpolyglycol ethers, magnesium stearate, sodium oleate, etc.); and/or dispersing agent, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound in present in an amount substantially between about 0.005–0.5%, preferably 0.008–0.1%, by weight of the mixture (i.e. especially in aqueous preparation form). Thus, the present invention contemplates over-all compositions which comprise mixtures of a conventional dispersible carrier vehicle such as (1) a dispersible inert finely divided carried solid, and/or (2) a dispersible carrier liquid such as an inert organic solvent and/or water preferably including a surface-active amount of a carrier vehicle assistant, e.g. a surface-active agent, such as an emulsifying agent and/or a dispersing agent, and an amount of the active compound which is effective for the purpose in question and which is generally between about 0.005–95%, and preferably 0.008–95%, by weight of the mixture.

In particular, the amount of active compound per unit area varies according to the purpose intended and the mode of application. In general, substantially between about 0.25–20 kg. of active compound per hectare are applied, preferably between about 0.5–10 kg. per hectare.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used according to the pre-emergence method, they are also particularly effective when used according to the post-emergence method.

Furthermore, the present invention contemplates methods of selectively killing, combating or controlling undesired plants, e.g. weeds and the like, which comprise applying to at least one of (a) such weeds and (b) their habitat, i.e. the locus to be protected, a herbicidally effective or toxic amount of the particular active compound of the invention alone or together with a carrier vehicle as noted above. The instant formulations or compositions are applied in the usual manner, for example by spraying, atomizing scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, i.e. as total or only selective herbicidal effect, and the plants which are to be controlled or protected. Therefore, in special cases, it is possible to go above or below the aforementioned concentration ranges.

The following examples illustrate, without limitation, the herbicidal activity of the particular active compounds of the present invention.

EXAMPLE 1

Pre-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Seeds of the test plants are sown in normal soil and, after 24 hours, watered with the given active compound preparation. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The particular active compounds tested, the amounts applied and the results obtained can be seen from the following Table 1:

TABLE 1.—PRE-EMERGENCE TEST

| Active compound | Active compound applied in kg./hectare | Echi-nochloa | Cheno-podium | Sinapis | Galin-soga | Stel-laria | Matri-caria | Cotton |
|---|---|---|---|---|---|---|---|---|
| (A) phenyl-CF$_3$ —NH—CO—N(CH$_3$)$_2$ (known) | 10 | 5 | 5 | 5 | 5 | 5 | 5 | 3 |
| | 5 | 5 | 5 | 5 | 5 | 5 | 5 | 2–3 |
| | 2.5 | 5 | 5 | 5 | 5 | 5 | 5 | 2 |
| | 1.25 | 4 | 5 | 4 | 4 | 5 | 4 | 0 |
| (1$_2$) CHF$_2$-phenyl—NH—CO—N(CH$_3$)$_2$ | 10 | 5 | 5 | 5 | 5 | 5 | 5 | 2 |
| | 5 | 5 | 5 | 5 | 5 | 5 | 5 | 1 |
| | 2.5 | 5 | 5 | 5 | 5 | 5 | 5 | 0 |
| | 1.25 | 4 | 5 | 4 | 5 | 5 | 5 | 0 |

EXAMPLE 2

Post-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Test plants which have a height of about 5–15 cm. are sprayed with the given active compound preparation until just dew moist. After three weeks, the degree of damage to the plants is determined and characterized by the values 0–5, which have the following meaning:

0—no effect
1—a few slightly burnt spots
2—marked damage to leaves
3—some leaves and parts of stalks partially dead
4—plant partially destroyed
5—plant completely dead.

The particular active compounds tested, their concentrations and the results obtained can be seen from the following Table 2:

TABLE 2.—POST-EMERGENCE TEST

| Active compound | Concentration of active compound in percent | Echi-chloa | Cheno-podium | Sina-pis | Galin-soga | Stel-laria | Urti-ca | Matri-caria | Cotton |
|---|---|---|---|---|---|---|---|---|---|
| (A) phenyl-CF$_3$ —NH—CO—N(CH$_3$)$_2$ (known) | 0.1 | 5 | 5 | 5 | 5 | 5 | 5 | 5 | 3–4 |
| | 0.05 | 5 | 5 | 5 | 5 | 5 | 5 | 4 | 2 |
| | 0.025 | 5 | 4–5 | 5 | 5 | 5 | 4–5 | 3 | 1 |
| | 0.125 | 5 | 4–5 | 5 | 5 | 4 | 4 | 3 | 0 |
| (1$_3$) CHF$_2$-phenyl—NH—CO—N(CH$_3$)$_2$ | 0.1 | 5 | 5 | 5 | 5 | 5 | 5 | 5 | 2 |
| | 0.05 | 5 | 5 | 5 | 5 | 5 | 5 | 4 | 1 |
| | 0.025 | 5 | 5 | 5 | 5 | 5 | 4 | 3 | 0 |
| | 0.0125 | 5 | 5 | 5 | 5 | 5 | 4 | 3 | 0 |

EXAMPLE 3

CHF$_2$-phenyl—NHCON(CH$_3$)$_2$ (1$_4$)

A solution of 10 g. 3-difluoromethyl-phenyl isocyanate in 30 ml. dioxan is added dropwise at room temperature to 100 ml. of a 10% aqueous dimethyl amine solution. The temperature is allowed to rise to 30° C. After subsidence of the reaction, the N-(3-difluoromethyl-phenyl)-N′,N′-dimethyl urea (11 g. yield) is filtered off with suction. M.P. 136 to 138° C.

The 3-difluoromethyl-phenyl isocyanate (as yet unknown) is prepared as follows:

(1) 2-nitrobenzal fluoride.—732 g. 3-nitrobenzal chloride and 400 ml. anhydrous hydrofluoric acid are placed in a stainless steel pressure vessel. At an interval temperature of about 10° C., nitrogen is pumped in up to 5 atmospheres gauge pressure. The reaction temperature is then brought to 115° C. over three and a half hours, with stirring. The main reaction takes place between 70 to 80° C. The interval pressure is kept between 10 to 11 atmospheres gauge by releasing via a valve the hydrogen chloride which is formed. In the later stages of the reaction, at up to 115° C., the pressure adjusts itself to about 16 atmospheres gauge. Cooling is effected, and the excess hydrofluoric acid is initially distilled off. The organic residue is then fractionally distilled. 347 g. 3-nitrobenzal fluoride are obtained as a liquid of B.P. 112 to 114° C./11 mm. Hg and having a refractive index $n_D^{20}=1.5125$. Further distillation also yields 255 g. of predominantly unchanged starting material. The yield, with reference to the charge, is 56.5% of the theory, and with reference to conversion about 87% of the theory.

(2) 3-aminobenzal fluoride.—186 g. 3-nitrobenzal fluoride are dissolved in 1000 ml. tetrahydrofuran and hydrogenated in the presence of 50 g. Raney nickel at 30° C. with hydrogen at 60 atmospheres gauge over a period of 160 minutes. After filtration, the amine is isolated by distillation. Yield: 126 g. (82% of the theory), B.P. 100–102° C./11 mm. Hg, refractive index $n_D^{20}=1.5235$.

(3) 3-isocyanatobenzal fluoride.—520 g. phosgene in 1100 ml. chlorobenzene are placed in a flask. A solution of 272 g. 3-aminobenzal fluoride in 1800 ml. chlorobenzene is run in at a temperature between 0 and 10° C. After completion of the addition, heating is effected slowly to 120° C., and at this temperature a vigorous stream of phosgene is passed through for a further 90 minutes. Blowing out with carbon dioxide at 120° C. is then effected for 3 hours, followed by working up by distillation. Yield: 289 g. (90% of the theory) 3-isocyanatobenzal fluoride, B.P. 82° C./12 mm. Hg, refractive index $n_D^{20}=1.5035$.

EXAMPLE 4

In manner analogous with the above-described active compound preparation, there are obtained:

(2₁) 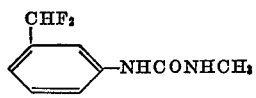

M.P. 106° C.

(3₁) 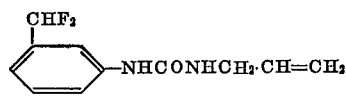

M.P. 94° C.

(4₁) 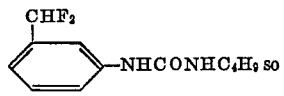

M.P. 90–91° C.

EXAMPLE 5

(5₁) 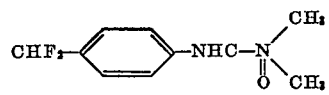

A solution of 12.5 g. 4-difluoromethyl-phenyl isocyanate in 20 ml. acetone is added dropwise to 100 ml. of an aqueous dimethylamine solution (10%). N-(4-difluoromethylphenyl)-N',N'-dimethyl urea, M.P. 151° C., is obtained in crystalline form. Yield: 12 g.

In analogous manner, there is also obtained:

(6₁) 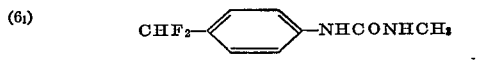

M.P. 170–171° C. (decomposition)

EXAMPLE 6

(7₁) 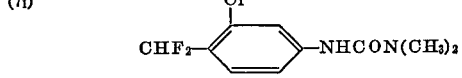

A solution of 5 g. 3-chloro-4-difluoromethyl-phenyl isocyanate in 20 ml. dioxan is added to 50 ml. of a 10% aqueous dimethyl-amine solution, and the N-[(3-chloro-4-difluoromethyl)-phenyl]-N',N'-dimethyl urea formed (5 g.) is filtered off with suction. M.P. 148° C.

EXAMPLE 7

(8₁) 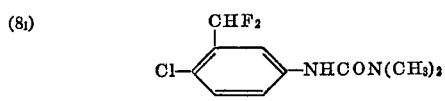

45 g. 4-chloro-3-difluoromethyl-phenyl isocyanate are added dropwise to 50 ml. of a 10% aqueous dimethyl-amine solution, and 5 g. N-[(4-chloro-3-difluoromethyl)-phenyl]-N',N'-dimethyl urea of M.P. 112–113° C. are obtained.

In analogous manner, there is also formed:

(9₁) 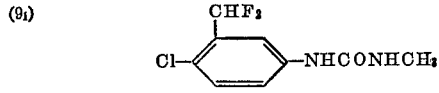

M.P. 141–142° C.

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

In manner analogous with the above-described preparation of 3-nitrobenzal fluoride (cf. Examples 3 (1)) there are obtained:

4-nitrobenzal fluoride, a liquid of B.P. 113 to 114° C./12 mm. Hg, having a refractive index $n_D^{20}=1.5120$.

2-chloro-5-nitrobenzal fluoride, a liquid of B.P. 123 to 124° C./10 mm. Hg, having a refractive index $n_D^{20}=1.5405$.

In manner analogous with the above-described preparation of 3-aminobenzal fluoride (cf. Example 3 (2)) there are obtained:

4-aminobenzal fluoride, which is phosgenated in solution without preceding isolation of the amino compound 2-chloro-5-aminobenzal fluoride, M.P. 49 to 52° C. (B.P. 129 to 131° C./12 mm. Hg).

In manner analogous with the above-described preparation of the 3-isocyanatobenzal fluoride (cf. Example 3 (3)) there are obtained:

4-isocyanatobenzal fluoride, a liquid of B.P. 83° C./11 mm. Hg, having a refractive index $n_D^{20}=1.5074$.

2-chloro-5-isocyanatobenzal fluoride, M.P. 39 to 42° C. (B.P. 107 to 108° C./11 mm. Hg).

What is claimed is:

1. A N-difluoromethyl-phenyl urea of the formula

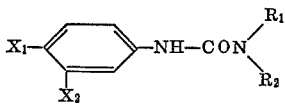

in which $R_1$ is selected from the group consisting of hydrogen and alkyl of 1–4 carbon atoms, $R_2$ is selected from the group consisting of alkyl of 1–4 carbon atoms and alkenyl of 3–4 carbon atoms, and one of $X_1$ and $X_2$ is difluoromethyl while the other of $X_1$ and $X_2$ is selected from the group consisting of chloro and hydrogen.

2. A compound according to claim 1 wherein $R_1$ and $R_2$ each individually is $C_{1-4}$ alkyl.

3. A compound according to claim 1 wherein $R_1$ and $R_2$ are the same $C_{1-4}$ alkyl.

4. A compound according to claim 1 wherein $R_1$ is selected from the group consisting of hydrogen and $C_{1-2}$ alkyl, $R_2$ is $C_{1-2}$ alkyl, $X_2$ is difluoromethyl, and $X_1$ is hydrogen.

5. A compound according to claim 1 wherein such compound is N-(3-difluoromethyl-phenyl)-N',N'-dimethyl urea of the formula

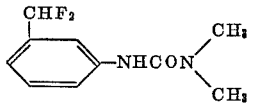

6. A compound according to claim 1 wherein such compound is N-(3-difluoromethyl-phenyl)-N'-methyl urea of the formula

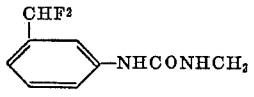

7. A compound according to claim 1 wherein such compound is N-(3-difluoromethyl-phenyl)-N'-(α-allyl) urea of the formula

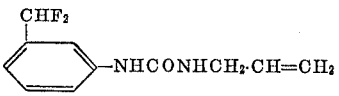

8. A compound according to claim 1 wherein such compound is N-(3-difluoromethyl-phenyl)-N'-isobutyl urea of the formula

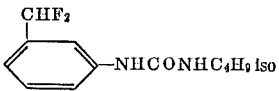

9. A compound according to claim 1 wherein such compound is N-(4-difluoromethyl-phenyl)-N',N'-dimethyl urea of the formula

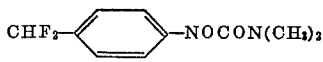

10. A compound according to claim 1 wherein such compound is N-[(3-chloro-4-difluoromethyl)-phenyl]-N',N'-dimethyl urea of the formula

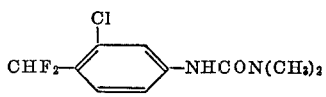

References Cited

UNITED STATES PATENTS

| | | | |
|---|---|---|---|
| 3,177,249 | 4/1965 | Martin et al. | 260—553 A |
| 3,244,504 | 4/1966 | Martin et al. | 260—553 A |
| 3,241,942 | 3/1966 | Martin et al. | 260—553 A |
| 2,723,192 | 11/1955 | Todd | 260—553 A |
| 2,726,150 | 12/1955 | Wolter | 260—553 A |
| 2,764,478 | 9/1956 | Searle | 260—553 A |

LEON ZITVER, Primary Examiner

M. W. GLYNN, Assistant Examiner

U.S. Cl. X.R.

71—120; 252—351; 260—453 A, 453 PH; 424—322